Patented July 8, 1930

1,770,132

UNITED STATES PATENT OFFICE

ALFRED GRAF von SODEN-FRAUNHOFEN, OF FRIEDRICHSHAFEN, GERMANY, ASSIGNOR TO ZAHNRADFABRIK AKTIENGESELLSCHAFT, OF FRIEDRICHSHAFEN, BODENSEE, GERMANY

GEAR

Application filed December 22, 1927, Serial No. 241,854, and in Germany January 3, 1927.

My invention relates to gears and more especially to gears having a unidirectional driving device, for example in the manner of a ratchet in connection with free wheel mechanisms. It has special reference to gears of this kind in which the oscillation of the working levers is caused by cams, eccentrics or the like. The primary object of my invention is greatest possible economy in the transmission gear.

Another object is to attain a speed of revolution in the driven shaft which corresponds to the direct drive or speed with change speed spur gearing.

A further object is the locking of the whole gear mechanism when the revolutions of the driven shaft approximate those of the driving shaft.

In gears of the kind described it is usual to have the cams or eccentrics fixed or stationary in relation to the revolving unidirectional driving devices, or to have stationary unidirectional driving device driven by rotating cams or eccentrics.

According to my invention both elements are revolving, one of them in dependency of the driving, the other in dependency of the driven shaft. This has the advantage that from the beginning of the rotation of the driven shaft that portion of the motor performance which corresponds to the momentary turning moment of the motor and to the revolutions of the driven shaft is transmitted directly from the motor to the driven shaft. Only the remaining portion of the motor performance, which causes the increase in the turning moment of the driven shaft, is transmitted by the unidirectional driving device. With increasing number of revolutions of the driven shaft the portion of the performance passing through the unidirectional devices is reduced automatically. When this portion reaches the value zero then direct transmission is going on.

If, for example, according to my invention the cams or eccentrics are connected to the driven shaft and the unidirectional driving devices are fastened to the fly wheel of the driving motor, then upon starting the revolutions a considerable number of oscillations per time unit will occur because the cams are practically at a stand still compared with the revolving driving devices. But as soon as the driven shaft has taken up a certain velocity in rotation then the cams are also revolving with the same speed and thereby reducing the relative speed of revolution between the driving devices and the cams or eccentrics. Thus the oscillations of the levers of the unidirectional driving devices are constantly decreasing per second, but the time period of operation for one oscillation is constantly becoming longer. When the driven shaft has attained the same number of revolutions per second as the driving shaft, so that the unidirectional driving devices and the cams are revolving at equal speed, then direct transmission is reached.

For this purpose, according to my invention, it is necessary that the oscillating levers of the unidirectional driving devices and the cams or eccentrics are so chosen relatively to their number and length or lift, respectively, that the maximum of the revolutions of the driven shaft reaches the number of revolutions of the driving shaft, wherefore it may be advisable in certain cases to insert a special transmission for example a couple of spur wheels of corresponding dimensions.

Furthermore, according to my invention I provide means for changing the lift of the cams or the eccentricity of the eccentrics whereby a further possibility of precise regulation is attained. For this purpose I bevel the cams in the direction of the shaft axis and make them slidable in this direction. With eccentrics the same may be done or their eccentricity may be made changeable in any other well known manner. This changing in the lift of the cams or the eccentricity of the eccentrics may be accomplished by means operated at will or automatically. In this latter case a weight regulator may be applied tending to increase the lift of the cams or the eccentricity of the eccentrics, whereas the reaction of the levers of the unidirectional driving devices acts in the opposite direction.

Last but not least, according to my invention, I provide a one way clutch or brake in connection with a fixed casing surrounding the gear or connected with some other stationary element. This clutch is adapted to connect or disconnect with the unidirectional driving device, directly or indirectly.

If in accordance with my invention, only the number of cams and unidirectional driving devices, the lift of the cams and the length of the levers of the devices, and possibly the ratio of a supplemental gear, are so chosen that the maximum of the revolutions of the driven shaft approximates the revolutions of the driving, but the unidirectional driving devices are not made to rotate all the time, then this clutch should be operated to allow for rotation as soon as the number of revolutions of both shafts tend to become equal. Thereby in this case direct transmission is attainable. This clutch may also be made to operate automatically, for example like a free wheel mechanism.

The working of the corresponding one-way clutch or brake in the arrangement with constantly revolving cams and unidirectional driving devices will be explained together with the drawings.

Having given a general description of my invention I now want to point it out more in detail referring to the drawings representing an example embodying my invention.

Figure 1:
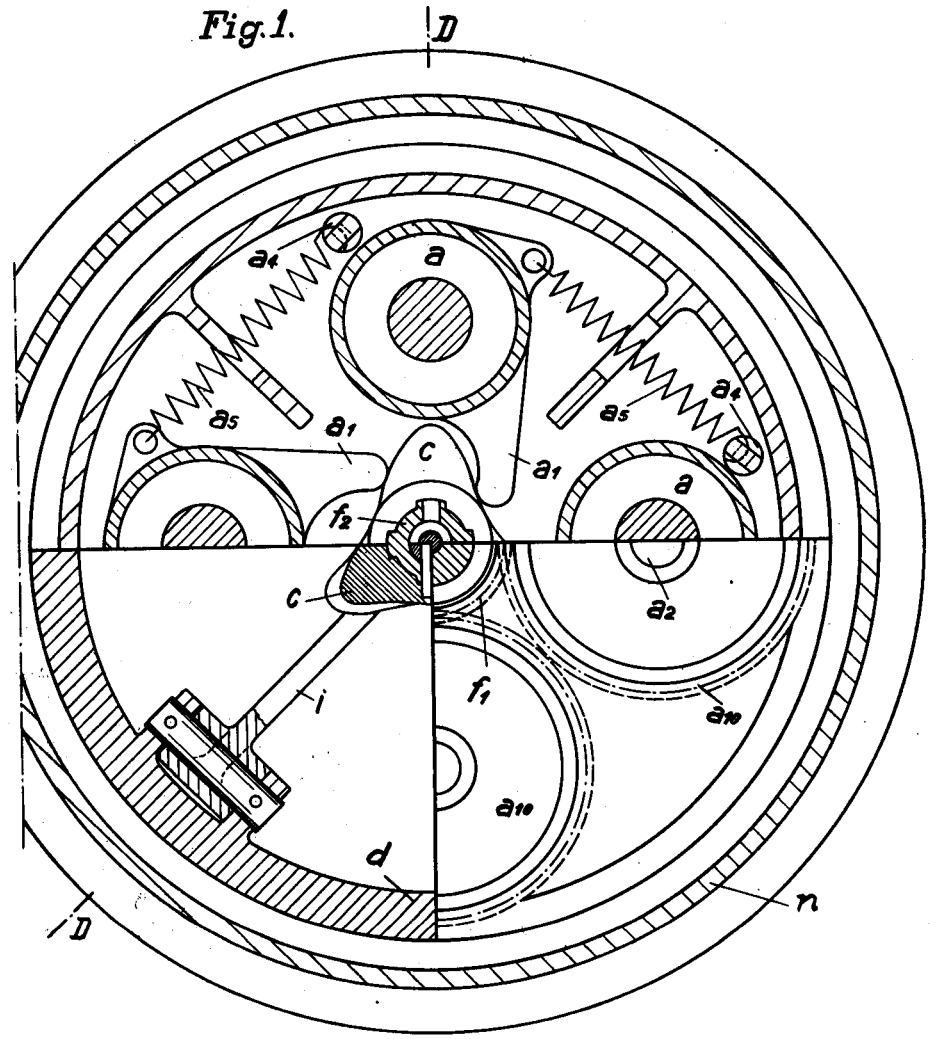
Fig. 1 is a combination cross section through the gear, whereof the lower left hand quarter is taken on line A—A of Fig. 2, the upper half is taken on line B—B and the lower right hand quarter on line C—C, both of Fig. 2.
Figure 2:
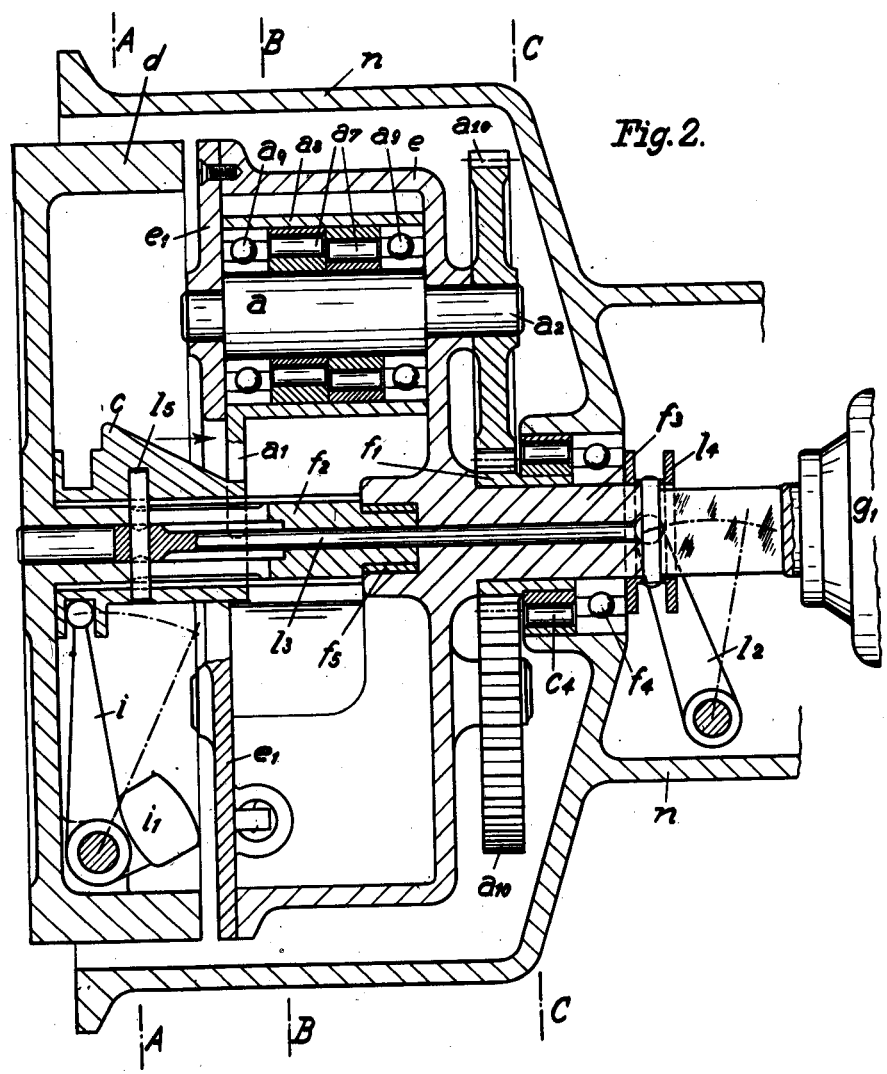
Fig. 2 is a longitudinal section taken on line D—centre—D of Fig. 1.

The fly wheel of the motor (not shown) is designated by the letter $d$. Shaft $f_2$ is situated concentric with the fly wheel $d$, and connected to shaft $f_2$ is cam $c$. There are four unidirectional driving devices $a$ arranged around the longitudinal centre line of shaft $f_2$. They are supported by the carrier casing $e$ and the disc $e_1$ in which their shafts $a_2$ are journaled. Levers $a_1$ of the driving devices are pressed against cam $c$ by means of springs $a_5$ fastened to pins or bolts $a_4$.

Revolutions of cam $c$ cause oscillations of levers $a_1$. These oscillations are transformed into a unidirectional rotation by means of free wheel mechanisms $a_7$ which may be of any well known construction. There are spur wheels $a_{10}$ fixed on shafts $a_2$ which mesh with spur wheel $f_1$ loosely supported by the driven shaft $f_3$. This shaft with one end is journaled on shaft $f_2$ by means of bush $f_5$, whereas its other end is supported in the roller bearing $f_4$ which is surrounded by the fixed casing $n$. Shaft $f_3$ may transmit the rotation to the driving axle of an automobile for example. In this case a differential gear may be provided which is indicated by the letter $g_1$ and which may serve for reversing.

In the example represented the outer shape of cam $c$ shows an inclination in the axial direction and also the cam can be shifted in this direction. This arrangement allows for varying the oscillating movement of levers $a_1$, because shifting of cam $c$ means changing its lift.

Means are provided for causing automatic shifting of cam $c$. There are levers $i$ situated inside of the fly wheel $d$ to which weights $i_1$ are fastened adapted to cause levers $i$ to swing to the right hand side because of centrifugal forces. Thereby cam $c$ is shifted in the direction of the arrow (to the right hand side) so that the increased shape of the cam portion corresponding to and cooperating with levers $a_1$ causes an increase in their oscillating movement.

Besides there may be provided a lever $l_2$ allowing for shifting cam $c$ at will by means of slip ring $l_4$, transmitting rod $l_3$ inside of shafts $f_2$ and $f_3$ and of cross bar $l_5$ connecting to cam $c$.

The gear will work in the following manner:

When starting motion casing $e$ together with the unidirectional driving devices $a$ at first may be taken as stationary for example, whereas spur wheel $f_1$ shall be free to revolve. Then a beginning of rotation of fly wheel $d$ will cause revolutions of spur wheel $f_1$ by means of cams $c$, unidirectional driving devices $a$ and spur wheel $a_{10}$, the speed of these revolutions relative to the rotation of the fly wheel depending on the number of cams, their longitudinal position on the shaft, the number of unidirectional driving devices, the length of their levers and on the ratio of transmission between the two spur wheels. The rotation of spur wheel $f_1$ in direction will be reverse to the direction of the fly wheel. But if wheel $f_1$ is arrested and casing $e$ is free to revolve then casing $e$ together with shaft $f_3$ will rotate and wheel $a_{10}$ will transmit the reaction to fixed wheel $f_1$. For this purpose this wheel $f_1$, in the example represented, is connected to outer casing $n$ which is stationary. This connection however is made disconnectible because of reasons explained further below. The connecting element $c_4$ constitutes a free wheel mechanism.

This whole arrangement has the advantage that the speed of rotation of the revolving cams relatively to the revolving unidirectional driving devices decreases with increasing velocity of the driven shaft, so that the oscillations of the levers $a_1$ are constantly lessening in number per time unit. They are coming to zero when the numbers of revolutions of both shafts equal each other. The levers of the unidirectional driving devices will work slower and slower until they come to a stand still. Then the reaction on wheel $f_1$ also will become zero and it tends to rotate together with the whole gear mechanism. To make this possible the above mentioned free wheel mechanism $c_4$ is provided, for which a disconnectible clutch or the like may be substituted in case it is not intended to provide for automatic operation but for operation at will.

I do not want to be limited to the details described or shown in the drawings as many variations will occur to those skilled in the art.

What I claim is:

A gear comprising a driving shaft and a driven shaft substantially in alignment with and abutting each other; a number of cams connected to said driving shaft; a carrier casing connected to said driven shaft; a number of unidirectional driving devices mounted in said casing; said devices comprising levers adapted to be oscillated by said cams; spur wheels rigidly fixed to the driven parts of said unidirectional driving devices and constituting a system of planetary wheels situated around the axis of said driving and driven shafts; a stationary part; a sun wheel loosely mounted on said driven shaft; and a free wheel mechanism situated between said stationary part and said sun wheel; said mechanism being adapted to lock said sun wheel in the direction reverse to the turning direction of said driven shaft but to give its rotation free in the turning direction of said driven shaft.

ALFRED GRAF v. SODEN-FRAUNHOFEN.